United States Patent [19]
Vetter

[11] Patent Number: 5,543,869
[45] Date of Patent: Aug. 6, 1996

[54] FRAME REGISTRATION

[76] Inventor: Richard Vetter, 17627 Camino de Yatasto, Pacific Palisades, Calif. 90272

[21] Appl. No.: 529,673

[22] Filed: Sep. 18, 1995

Related U.S. Application Data

[63] Continuation-in-part of Ser. No. 221,036, Mar. 31, 1994, which is a continuation-in-part of Ser. No. 807,056, Dec. 12, 1991, abandoned.

[51] Int. Cl.⁶ ............................................. G03B 1/00
[52] U.S. Cl. ..................... 352/184; 352/232; 352/44
[58] Field of Search ............................ 352/184, 196, 352/232, 44, 40

[56] References Cited

U.S. PATENT DOCUMENTS

| | | | |
|---|---|---|---|
| 1,255,288 | 2/1918 | Brixey | 352/241 |
| 1,797,274 | 3/1931 | Ross | 352/196 |
| 1,819,541 | 8/1931 | Carleton | 355/46 |
| 2,375,962 | 5/1945 | Terwilliger | 352/43 |
| 3,502,411 | 3/1970 | Wells | 355/54 |
| 3,637,297 | 1/1972 | Yoshida | 352/38 |
| 3,682,540 | 8/1972 | Oxberry et al. | 355/18 |
| 4,534,630 | 8/1985 | Williamson | 352/194 |
| 5,328,073 | 7/1994 | Blanding et al. | 226/27 |

*Primary Examiner*—Michael L. Gellner
*Assistant Examiner*—Matthew Miller
*Attorney, Agent, or Firm*—Hornbaker; Rosen Freilich

[57] ABSTRACT

Systems are described for precisely positioning motion picture film frames at a camera film gate by the use of registration pins that project into film perforations, where the film frames are spaced by 2.5 perforation spacings, or perf spacings instead of the standard 4 perforations. In one system, the film is advanced a first time in steps of 5 perf spacings each to photograph alternate perf spacings film frames, (that are spaced by 2.5 perf spacings) perf spacings with the film gate mask being offset by 0.5 during a second pass when the film is advanced in steps of 5 perf. spacings each. In another system, the registration mechanism includes two sets of registration pins which are alternately projected into alternate film frames as the film is advanced in steps of 2.5 perf spacings. In another system, additional holes are punched into the standard film stock, so there are holes or perforations located at 2.5 perf. spacings along the length of the film.

3 Claims, 4 Drawing Sheets

U.S. Patent     Aug. 6, 1996     Sheet 1 of 4     5,543,869
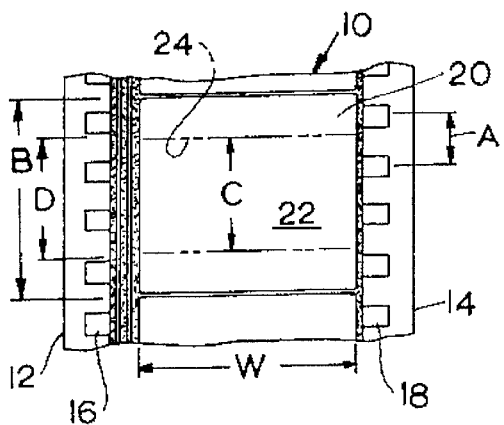
FIG. 1
PRIOR ART
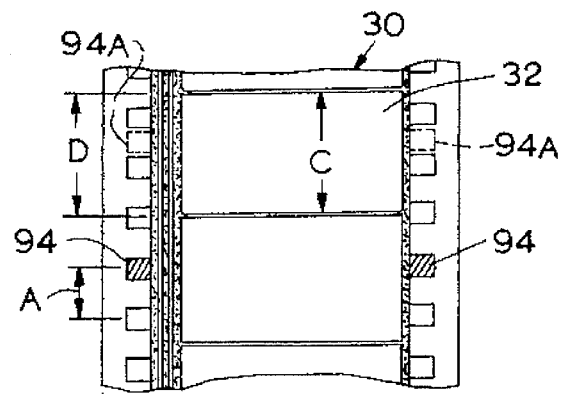
FIG. 6
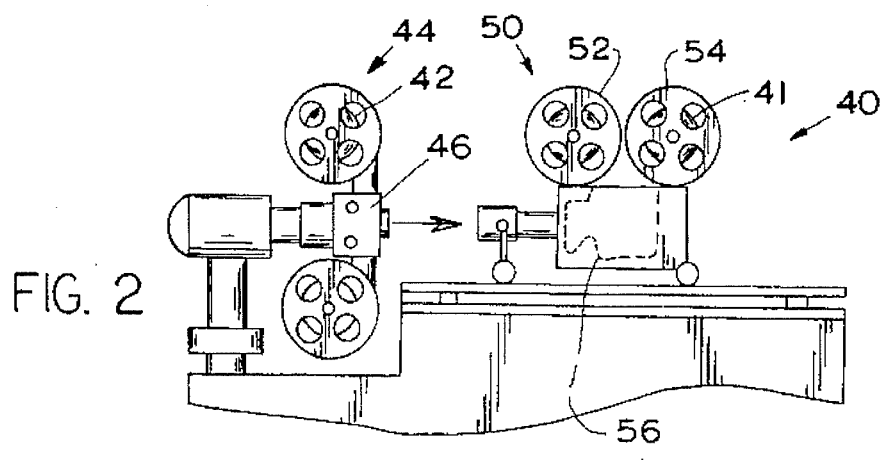
FIG. 2
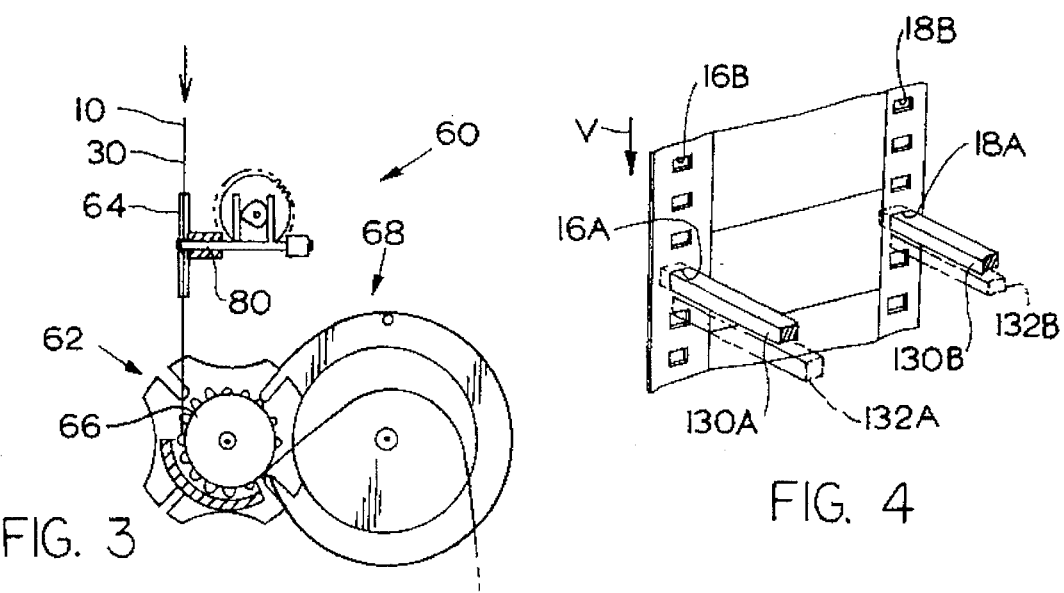
FIG. 3
FIG. 4

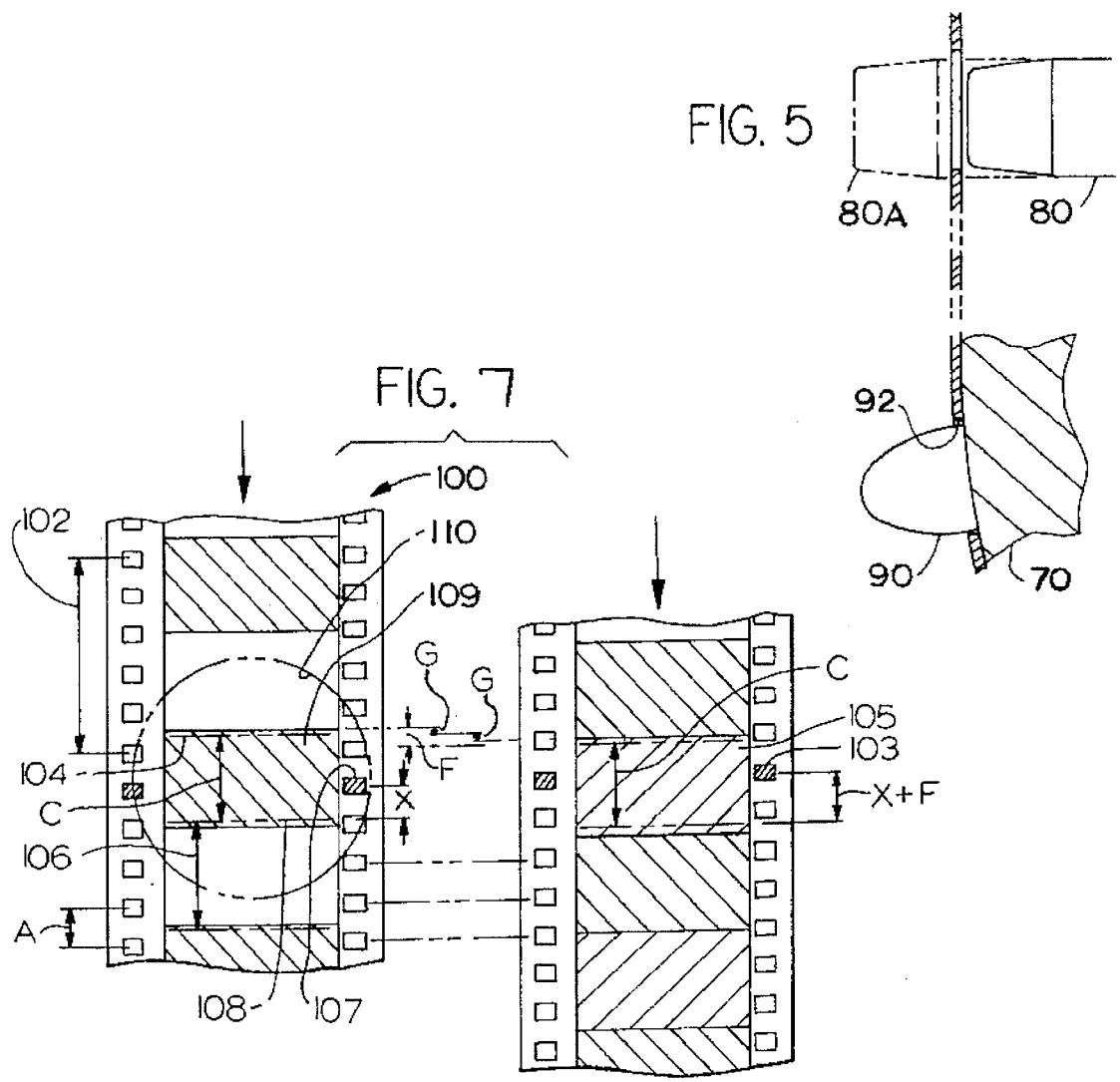
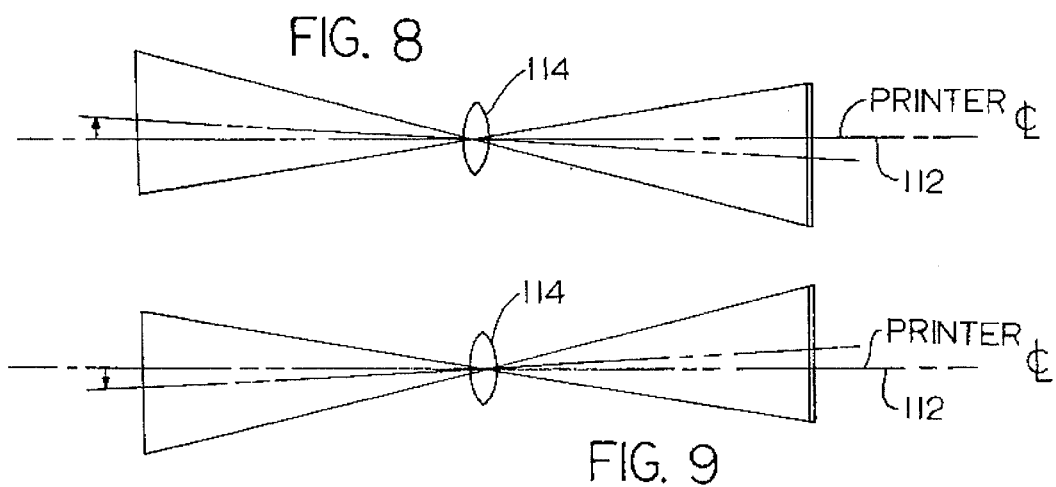

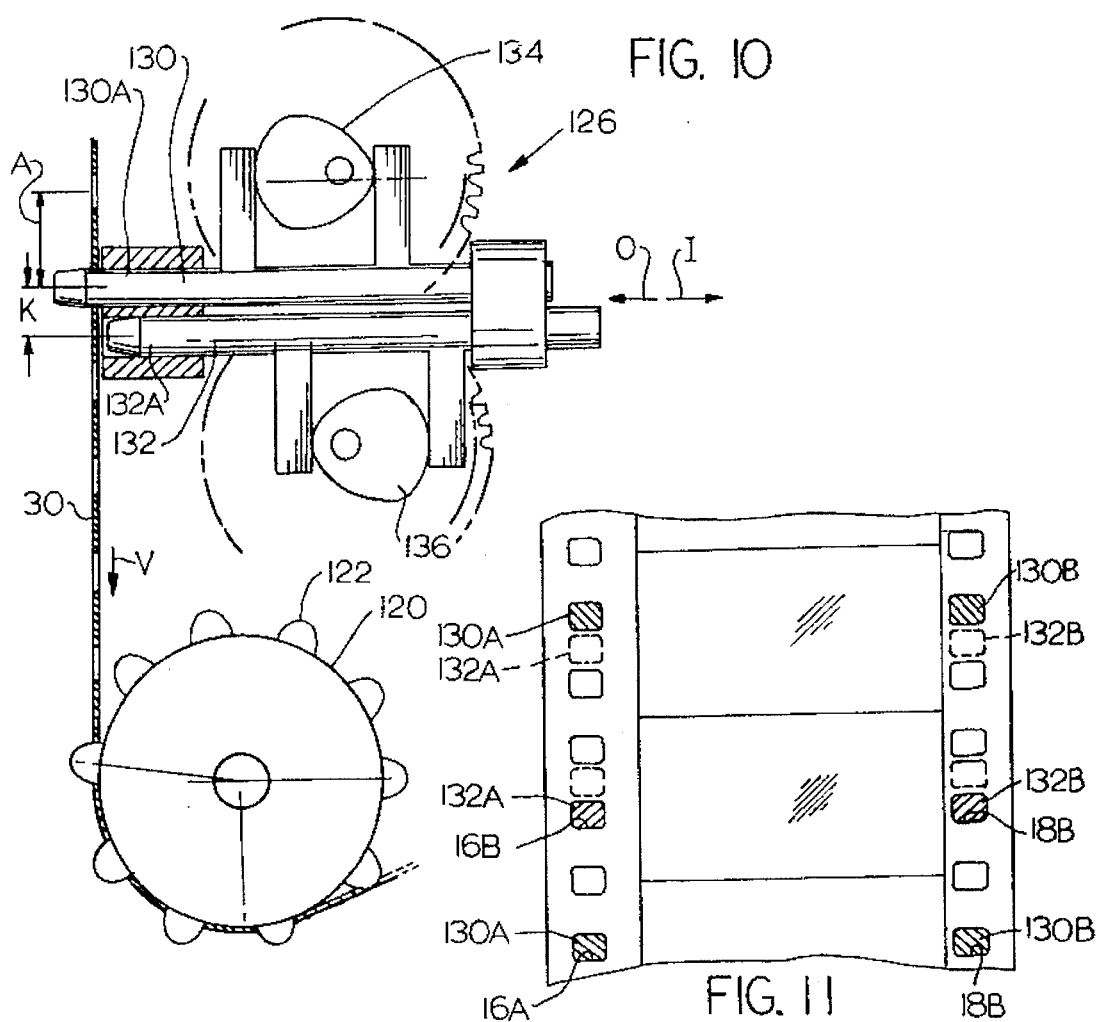
FIG. 10
FIG. 11
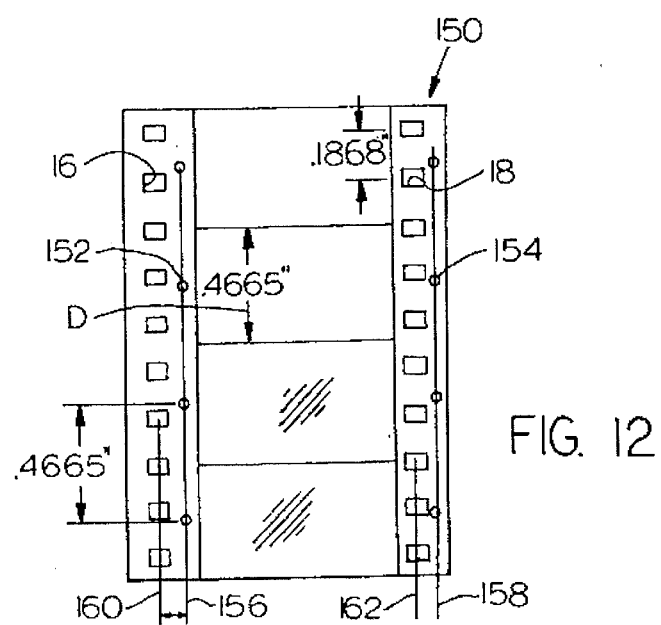
FIG. 12

FRAME REGISTRATION

CROSS REFERENCE TO RELATING APPLICATION

This is a continuation-in-part of U.S. patent application Ser. No. 08/221,036, filed Mar. 31, 1994, which is a continuation-in-part of Ser. No. 07/807,056, filed Dec. 12, 1991, now abandoned.

BACKGROUND OF THE INVENTION

In the 1880s, an Academy Standard film format was created for 35 mm film, wherein the film stock had two rows of perforations, each film frame had an aspect ratio (width divided by height) of 1.33 to 1, and the film frames were spaced apart by 4 perf. spacings (0.750 inch). This format was widely adopted in the 1890s. When soundtracks were added, the frame width and height were reduced, and an aspect ratio of 1.37 to 1 was adopted. In the 1950s, a new projection aspect ratio called Wide Screen Academy Format was adopted, wherein the same film was used, but the projector film gate mask was changed to have a smaller height than previously for an aspect ratio of 1.85:1. The film frames recorded by a camera and projected by the projector, were still of the same size and still spaced apart by 4 perf. spacings, but about 40% of the length of the film was not projected and therefore was wasted. It has been recognized that about 25% of the film used in the current 4 perforation format could be saved by spacing the frames by 3 perforations along the length of the film. Applicant has recognized that 37.5% of the film could be saved by spacing the film frames by 2.5 perforations. However, spacing of the film frames by a non-integer number of perforations, such as 2.5 perforations, can give rise to problems during film processing.

During projection onto theater screens, the film frames are advanced through the projection film gate by an intermittent sprocket wheel that is rotated in 90° steps by a Geneva mechanism. Geneva mechanisms wear, which results in turning the intermittent sprocket wheel by slightly more or less than 90° in each step, which results in significant film registration error. The precision of registration required during film processing, when an internegative is made that may produce thousands of release prints, is greater than that which is acceptable during projection. As a result, in film processing, registration pins are used to precisely position or register the film at the film gate.

When the film briefly comes to rest at the film gate, a pair of registration pins is projected through the film perforations. The registrations pins slightly shift the film position to precisely register the film frame. Where the film is advanced by an integer number of perforation spacings (such as 4) in each step, a perforation will be aligned with the registration pin at each film frame. However, where the film is advanced by a noninteger number of perforation spacings (e.g. 2.5), then a registration pin would punch a hole in the film at every other film frame (this is unacceptable). It would be desirable if the well accepted technique of pin registration could be used even for a system that advanced the film in steps of a noninteger number of perforation spacings such as 2.5.

SUMMARY OF THE INVENTION

In accordance with one embodiment of the present invention, systems are provided that enable the use of registration pins to precisely register motion picture film frames at a film gate, wherein the film frames are spaced apart by a non-integer number of perforation spacings such as 2.5 perforation spacings. In one system, the film is advanced by two film frames (5 perforation spacings) in each step during a first pass through the film gate and is similarly advanced during a second pass, but with the film gate mask being offset during the second pass. Another system includes two sets of registration pins which are offset from one another, with alternate sets of pins being used to register the film at alternate steps. In another system, registration holes are punched into standard film stock, so a registration hole or a regular perforation lies at a predetermined location with respect to each film frame.

The novel features of the invention are set forth with particularity in the appended claims. The invention will be best understood from the following description when read in conjunction with the accompanying drawings.

BRIEF DESCRIPTION OF THE DRAWINGS

FIG. 1 is a front elevation view of a strip of film of the prior art.

FIG. 2 is a simplified side elevation view of a film printing mechanism of the present invention.

FIG. 3 is a simplified sectional view of a film stepping and registration mechanism of a camera of the prior art and (when modified) of the present invention.

FIG. 4 is an isometric view of a registration mechanism of the prior art and showing, in phantom lines, a modification for use with one embodiment of the present invention.

FIG. 5 is an enlarged view of a portion of the registration mechanism of FIG. 3.

FIG. 6 is a front elevation view of a film strip of the present invention, wherein the film frames are spaced by 2.5 perforation spacings.

FIG. 7 indicates a film processing system of one embodiment of the present invention wherein film frames are photographed in two passes.

FIGS. 8 and 9 illustrate different orientations of the optical printer for use in the method indicated in FIG. 7.

FIG. 10 is a partial sectional view of a film stepping and registration mechanism constructed in accordance with another embodiment of the invention.

FIG. 11 is a side elevation view of the film strip of FIG. 10, indicating the positions of the registration pins.

FIG. 12 is a side elevation view of a film strip constructed in accordance with another embodiment of the invention, and indicating a registration pin set therefor.

DESCRIPTION OF THE PREFERRED EMBODIMENTS

Figure 13:
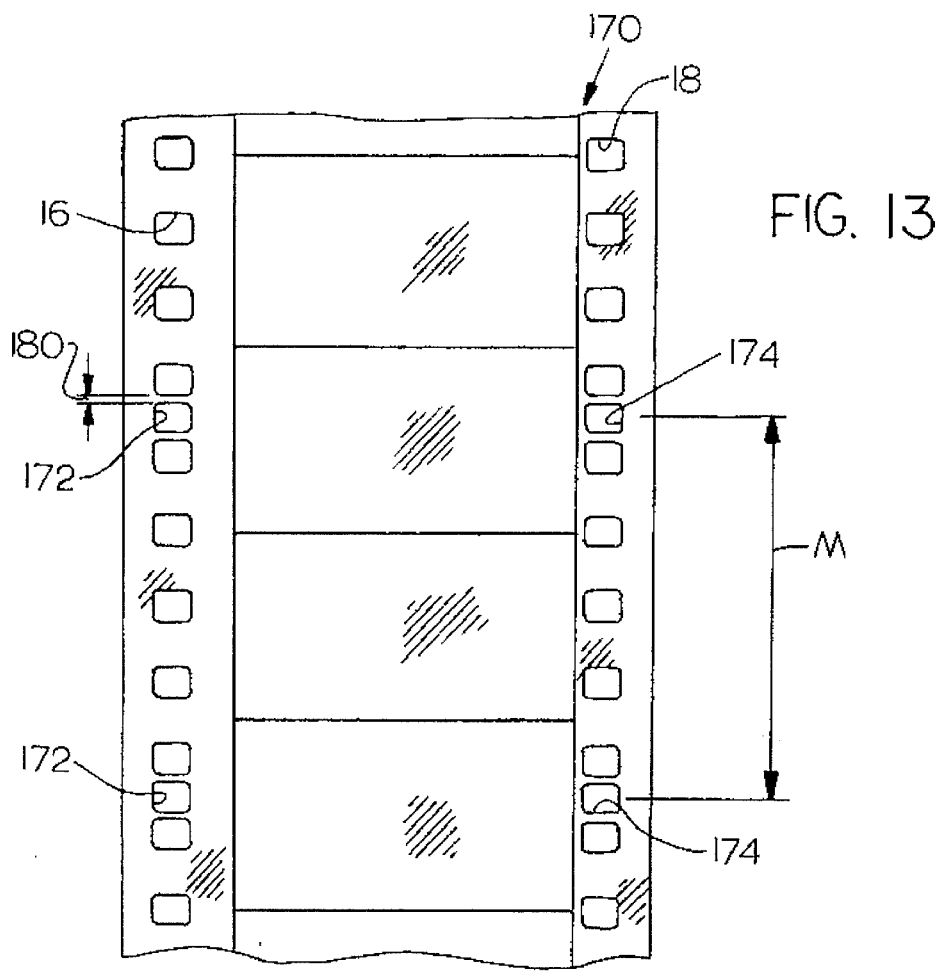
FIG. 13 is a front elevation view of a film strip constructed in accordance with another embodiment of the invention.

FIG. 1 illustrates a prior art strip of film 10 of the standard 35 mm format, which includes opposite edges or sides 12, 14 and a row of holes or perforations 16, 18 at each side or edge portion. The placement and size of each perforation, or perf, is specified in a standard, and the perfs are spaced apart by a perf spacing distance perf spacing A of substantially 0.187 inch. In the format that is currently used in commercial theater projection, the film contains film frames 20 that are spaced apart by a distance B equal to four times the perf spacing A, this being substantially 0.747 inch. When projecting the film on a screen, only a middle portion 22 of a height C of about 0.45 inch is actually projected onto the screen, to obtain a wider aspect ratio (width W of about 0.85 inch to height C) of 1.85 to 1. The rest of each film frame 20 is not projected, and is therefore wasted. Applicant has recognized that the distance C of about 0.45 inch is slightly less than the spacing D between 2.5 perforations (D=2.5A= 0.467 inch). As a result, applicant has proposed to distribute film strips (distribution prints) of the format shown in FIG. 6, wherein the film strip 30 includes film frames 32 that are spaced apart by a distance D equal to 2.5 times the perf spacing distance A. Each film frame 32 occupies a height C that is slightly less than the film frames spacing D. When one looks into the possibility of using the format of FIG. 6, wherein the frame spacing D equals a noninteger number of perf spacings (2.5 perf spacings) one realizes that the format of FIG. 6 is viable only if a way can be found to precisely register it in a processing camera.

FIG. 2 illustrates processing equipment 40 which applicant uses to produce an internegative 41 that is used to make many release prints that are distributed to motion picture theaters for projection onto motion picture screens. It is assumed that a camera has photographed scenes using the current format shown in FIG. 1 wherein the film frames are spaced apart by a distance B of 4 perfs. The camera film is edited and an interpositive is produced by contact printing. The interpositive film strip 42 is mounted in a projector 44 in a supply reel thereof so the film passes through a projection film gate 46. The equipment also includes a camera 50 which is loaded with intermediate film 41 which is of standard 35 mm file stock, with the same perforation size and spacing as the release print film shown in FIG. 1. Film in the camera moving from the supply reel 52 to the takeup reel 54 along a film path 56, is exposed so only the middle portion C (FIG. 1) of each film frame is exposed. The film frames are spaced by 2.5 perf. spacings to produce a film format shown in FIG. 6. After the exposed intermediate film is developed, hundreds or thousands of release prints are made from it by contact printing.

FIG. 3 shows a film stepping and registration apparatus 60 that can be used in the camera 50 of FIG. 2. The mechanism includes a film stepping mechanism 62 that advances the film in steps through a film gate 64 where a frame of film is exposed. Where the camera is used to record film frames spaced 4 perfs apart, a sprocket wheel 66 is used which has 16 sprocket teeth. A Geneva mechanism 68 advances the sprocket wheel 66 in 90° increments to advance the film in steps of 4 perf spacings each. To convert to the present system, applicant's substitutes a sprocket wheel that has 10 or 20 sprocket teeth on it, so at every 90° turn the sprocket wheel 70 advances the film by 2.5 or 5 perf spacings as discussed below.

It is noted that claws are more often used to pull down the film instead of sprocket wheels. In either case, when the film comes substantially to rest at the film gate 64, a registration pin 80 is projected through the film strip 10 or 30. Although the sprocket wheel 66 positions the film with moderate precision, the registration pin 80 assures high precision. For example, the Geneva mechanism 68 wears with use, so it may start by providing a registration accuracy of perhaps 0.0006 inch, which degrades to perhaps 0.001 inch with time. The registration pin 80 can consistently maintain precision within about 0.0002 inch. FIG. 5 illustrates that a sprocket wheel may have sprocket teeth 90 slightly narrower than each film perf 92. A registration pin 80 projects through the film to the position 80A, and in so doing it moves down the film by a small fraction of the perf spacing.

If the film is moved down by steps of 2.5 perf spacings, then the registration pins may lie at a position indicated at 94 in FIG. 6 at a given time. When the film moves down by another 2.5 perf spacings, then the pin will lie at a position 94A with respect to the film. If no steps are taken to avoid this situation, then a pin at 94A would punch a hole in the film which is, of course, not acceptable.

FIG. 7 indicates a method that applicant can use to record film frames at spacings of 2.5 perf spacings. The film strip 100 is passed a first time through the camera with the film advanced by steps 102 equal to five times the perf spacing A (by substituting a 20 tooth wheel for the 16 tooth wheel at FIG. 3). As a result, only odd-numbered frames (every other frame) are photographed; even-numbered frames will be photographed in an interlaced manner, during a second pass. A film mask is used so that only an area 104 of a height C of about 0.45 inch is exposed, which is slightly less than 2.5 times the perf spacing. As a result, areas of a height 106 of slightly greater than 2.5 times the perf spacing left unexposed. These areas 106 will be exposed during a second pass.

After the entire film strip that contains thousands of images is exposed, the film is again passed through the camera, in steps of five perf spacings each, to photograph the even-numbered frames. The film is advanced by 5 perf spacings for the second pass. During the second pass, the film gate mask of height C is moved down by a distance F equal to 0.5 perf spacing. As a result, the distance X between a registration pin at 107 and a bottom edge 108 of the mask (for the first pass) is increased to the distance X plus F (for the second pass). The offset F of 0.5 perf spacing allows pins at 103 to lie at the same positions with respect to the second-to-be exposed frames 105 as the pins at 107 with respect to the first-to-be exposed frames 109. It is noted that the second frames 105 are offset by 2 perf spacings from the positions of the areas 106.

It is noted that a prior art lens forms an image that is clear within an area 110 that has a height of almost 4 perf spacings, so the image will be clear even when the mask is raised or lowered but still lies within the circle 110. Additional clarity can be obtained by positioning each film frame area closer to the center of the area 110, as by lowering the bottom edge 108 for the film gate mask by a small distance G of one quarter perf spacing during the first pass, and raising the film gate mask by a small distance G of one quarter perf spacing during the second pass. FIGS. 8 and 9 show that the projector and camera are shifted slightly to assure that the center of each image projected by the projector is at the center of the camera image on the film area being exposed. The printer center line is indicated at 112, with the camera lens indicated at 114.

FIG. 10 indicates apparatus of another system of the invention, that is useful to expose all of the film frame areas that are spaced at 2.5 perf spacings, in a single pass through the processing camera. The camera includes a sprocket wheel 120 that is rotated in 90° increments by a Geneva mechanism. The sprocket wheel has ten teeth 122 so it advances the film 30 by 2.5 perf spacings in each step. A registration mechanism 126 includes two pairs of registration pins 130, 132, with a first pin 130A of the first set and a first pin 132A of the second set begin shown. A drive mechanism includes cams 134, 136 that rotate in synchronism and that move the pins in outward and inward directions 0, I. The centers of the pins are spaced apart a distance K equal to one half of the distance A between perfs. First, the first pins 130 project into sprocket perfs. The pins 130 are moved inwardly to withdraw them from the film perf spacings, the film is advanced in a direction V by 2.5 perfs and stops again. At that time, the second pins 132 are moved outwardly into film perfs. FIG. 4 indicates the two pins 130A, 130B of the first set and the pins 132A and 132B of the second set. At a first film step, the first pins 130A, 130B are projected through perfs 16A, 18A and withdrawn. Advancement of the film in the direction V by 2.5 perf spacings will result in the second pins 132A, 132B projecting through perfs 16B, 18B in the next frame. FIG. 11 also indicates this. During a first step, when the first pins 130A, 130B are advanced through perfs in the film, pin 130A projects through a first location 140 which lies substantially in the plane of the film thereat. During a second step, when the second pins 132A, 132B are advanced through perfs in the film, pin 132A projects through a second location 142 which also lies substantially in the plane of the film thereat. The centers of the first and second locations 140, 142 are spaced apart by a location spacing distance, where the location spacing distance is illustrated as equal to K. The location spacing distance equals a fraction of a perf spacing (0.5 perf spacing being shown where the location spacing distance equals K) plus a non-negative integer number (0, 1, 2, etc.) of perf spacings (with the non-negative integer being 0 in the illustrated example where the location spacing distance equals K). The use of two sets of registration pins has the advantage that only a single pass of the film is required, without adjustment of position of the film gate mask.

FIG. 12 illustrates a film strip 150 of another system of the invention. The film strip 150 has been modified by punching special or new registration holes 152, 154 so they lie along rows 156, 158 that are spaced from the row lines 160, 162 where the regular perforations 16, 18 lie. The registration holes 152, 154 are spaced apart by a distance D of 2.5 perf spacings. The same currently-used pin registration mechanism is used except that the pins are shifted laterally to be in line with the lines 156, 158, and the shape of the pins is modified to account for a different size for the holes 152, 154.

FIG. 13 illustrates another film strip 170 of regular 35 mm film stock, except that additional, or new registration holes 172, 174 have been punched into the film. Each of the registration holes 172 has the same shape as the regular perfs 16, 18, and lie midway between two of the regular perfs. The holes 172, 174 are formed at distances M of 5 perforation spacings. The prior registration pin mechanism used for 4 perf spacing can be used to register the frames at 2.5 perforation spacings (with a different intermittent sprocket wheel). The presence of the holes 172, 174 weakens the film around the holes, in that there is only a narrow thickness 180 of film material between each registration hole and adjacent perforations. However, the intermediate film stock moves only once through the camera, and the weakness is unlikely to affect precise registration of the film. Of course, the holes 172, 174 must be positioned with great precision with respect to the perforations. In this method, applicant prefers to use the stronger and distortion-resistant polyester film stock for the intermediate film, instead of the presently used acetate film stock.

While each of the above systems for stepping film while allowing precision pin registration is an option, applicant prefers the system of FIG. 10, which uses alternating registration pins that are spaced apart by one half perf spacings. The advantage of this system is that the intermediate film stock does not have to be altered and exposure occurs in a single pass through the camera. Instead of spacing the pins by 0.5 perf spacing, they can be spaced by 1.5 perf or 2.5 perf. spacing. In other words, the pins are spaced by 0.5 perf plus a nonnegative integer (such as 0, 1, 2) number of perf spacings.

The dual registration pin set system of FIG. 10 can also be used with a camera that originally photographs a scene so the camera film frames are spaced apart by 2.5 perf spacings of regular 35 mm film stock. In that case, a smaller film gate mask is required to expose only an area lying within the height of 2.5 perf spacings, in addition to a mechanism for pulling down the film by 2.5 perf spacings instead of 4.

Figure 14:
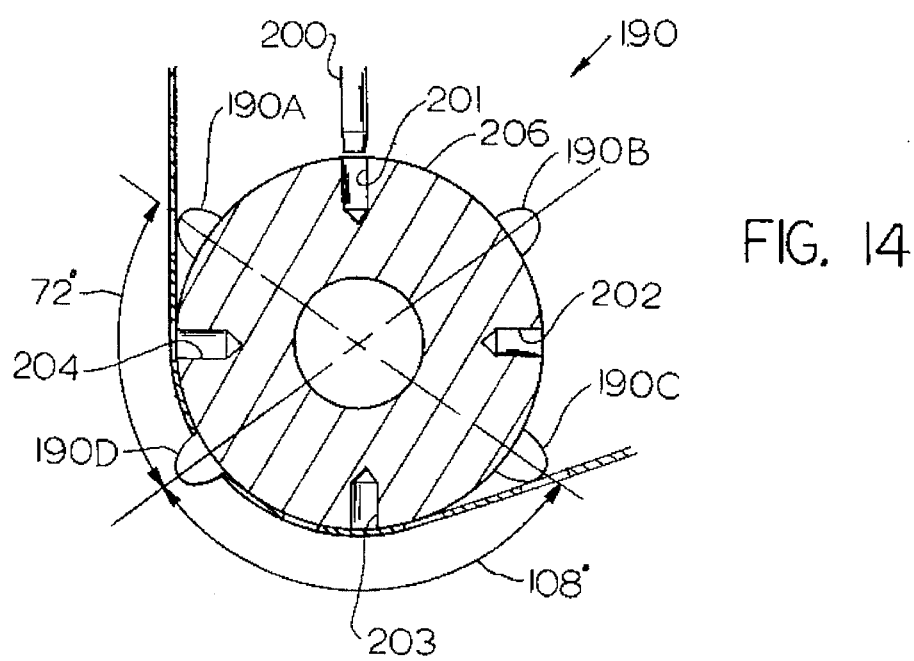
FIG. 14 is a side elevation view of a sprocket wheel constructed in accordance with another embodiment of the invention.

FIG. 14 shows a sprocket wheel 190 that can be used in place of wheel 120 of FIG. 10. Instead of providing 2.5 teeth per quadrant (per 90°), applicant provides a single tooth 190A, 190B, 190C, 190D per quadrant. However, to account for the fact that there are 2.5 perf spacings per quadrant, applicant spaces the teeth apart by 2 or 3 perf spacings. As a result, there is an angular spacing of 72° or 108° between teeth, as indicated. The advantage of the wheel 190, is that there are fewer teeth, so there are fewer teeth to be ground to precisely locate the film, with only one tooth locating the film at any given time. The film should be wrapped at least 108° but not much more around the wheel, with a wrap of 110° indicated.

Applicant can precisely locate the intermittent sprocket wheel 190 at each 90° step of rotation, by a sprocket wheel registration pin. The pin 200 is inserted into one of four wheel registration holes 201–204, for a brief period of time as the wheel is closely approaching a stop in the same manner as registration pins project into film perforations. The use of pin 200 requires a loose Geneva mechanism to allow slightly more sprocket wheel rotation by pin 200. For example, the Geneva mechanism may have to be loose enough to allow pin 200 to advance the periphery 206 of the wheel by an additional 0.001 inch. Of course, the wheel registration holes can extend into ends of the wheel. This sprocket wheel can be used in a projector.

While the above systems are described for use with film frames spaced by 2.5 perf spacings, they can be adapted to film where the frames are to be spaced by another noninteger number of perf spacings, such as 2.75.

Thus, the invention provides systems for use with a camera to record images on 35 mm film stock so the film frames are spaced apart by a non-integer number of perf spacings such as 2.5 perf spacings, and yet registration pins are used to precisely register the film stock at the film gate. A most promising system uses two sets of registration pins that are spaced apart by a non-integer number of perforation spacings such as 0.5 perforations, and which are alternately moved through the film (through the perfs). Another system involves moving the film in two passes through the camera, with the film mask being shifted by one half perf spacing between the first and second passes. Another system includes modifying the film stock to punch extra, or new registration holes therein so at every step of the film a registration pin enters one of the extra holes or a perforation. In the latter system, a first embodiment includes adding one or more additional rows of holes, with the holes spaced by 2.5 perf spacings (or some other non-integer number) so there is one hole for each film frame to be exposed. In the latter system, a second embodiment involves punching registration holes of the same size as the perforations, between every fourth and fifth perforation.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A method for processing a motion picture film by advancing a film strip along a film path in steps through a film gate, wherein said film strip has opposite sides and a row of evenly spaced perforations at each side, wherein said perforations are spaced at a predetermined perf spacing along each row, and wherein said method of advancing said film strip in steps includes operating a film stepping mechanism to position each film strip portion with moderate precision at the film gate and then very precisely positioning each film strip portion at the film gate by projecting at least one registration pin through a perforation in the film strip portion, characterized by:

said step of operating said film stepping mechanism includes operating it to advance said film strip by a plurality of perf spacings plus a fraction of a perf spacing in each step;

said step of very precisely positioning each film portion at said gate includes projecting each of a plurality of sets of registration pins into said sprocket holes in sequence at subsequent steps, including projecting a pin of a first set into one of said perforations at a first location during a first step, and projecting a pin of a second set into one of said perforations at a second location during a second step, where said second location is spaced from said first location along said film path by a location spacing distance that equals a fraction of a perf spacing plus a non-negative integer number of perf spacings, to avoid punching a hole in said film.

2. The method described in claim 1 wherein:

each of said sets of registration pins includes a pair of pins and said steps of projecting a pin of a set includes projecting a pair of pins into a pair of perforations;

said step of operating said film stepping mechanism includes operating it to advance said film strip in steps of 2.5 perf spacings;

said second location is spaced from said first location by 0.5 perf spacing.

3. A camera for producing film frame images spaced along the length of a strip of 35 mm film stock wherein the perforations are spaced by a perf spacing of substantially 0.187 inch, by stepping the film through a film gate and exposing at least part of each portion of the film that stops at the film gate, wherein the film is precisely registered at the film gate by projecting pins through perforations when the film stops at the film gate, and wherein the camera can produce film frames that are precisely spaced apart by 2.5 perforations wherein;

said camera includes first and second sets of registration pins and a drive mechanism that alternately projects said first set of pins and said second set of pins through perforations of said film that lie substantially at said film gate, when said film stops;

the pins of said second set being spaced from said pins of said first set by a location spacing distance that equals 0.5 times said perf spacing plus a non-negative integer times said perf spacing.

* * * * *